United States Patent

[11] 3,601,892

| [72] | Inventor | Heinrich H. Frank<br>Amherst, Ohio |
|---|---|---|
| [21] | Appl. No. | 826,875 |
| [22] | Filed | May 22, 1969 |
| [45] | Patented | Aug. 31, 1971 |
| [73] | Assignee | Emerson Electric Co.<br>St. Louis, Mo. |

[54] PIPE AND ROD CUT-OFF TOOL
4 Claims, 5 Drawing Figs.

[52] U.S. Cl. ................................................... 30/94
[51] Int. Cl. ...................................................... B23d 21/10
[50] Field of Search ........................................ 30/93, 94;
83/8, 12; 82/46

[56] References Cited
UNITED STATES PATENTS

| 669,866 | 3/1901 | Thomas | 30/94 |
| 1,040,202 | 10/1912 | Howe | 30/94 |
| 2,747,274 | 5/1956 | Willard | 30/97 |
| 1,448,877 | 3/1923 | Smith | 30/94 |

*Primary Examiner*—Othell M. Simpson
*Assistant Examiner*—Michael Koczo, Jr.
*Attorney*—J. D. Douglass ABSTRACT: A C-shaped frame carries a pipe or rod engaging roller at one end. The frame has ways upon which a carriage is slidably disposed and may be moved on the ways by a screw means rotatably journaled in the other end of the frame. The carriage has a pair of pipe engaging rollers which engage the opposite side of the pipe from the first roller. The carriage in turn has ways which slidably carry a cutoff holder. The tool is moved on the carriage by a second screw means which is angularly disposed relative to the first screw means and in interlocking sliding engagement with an angularly disposed cam surface on the cutoff tool holder.

INVENTOR.
Heinrich H. Frank

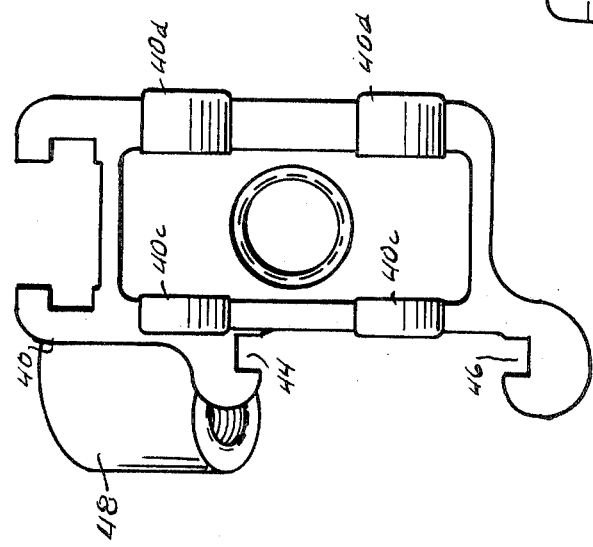
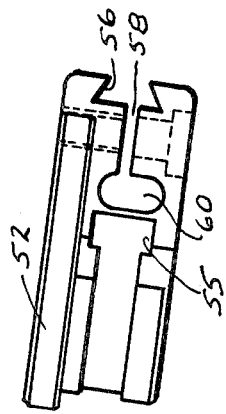
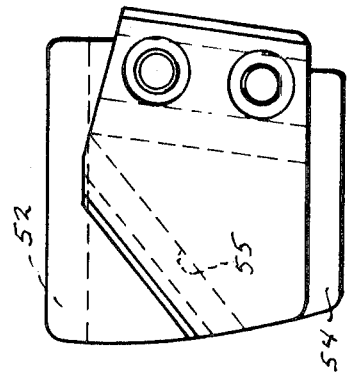
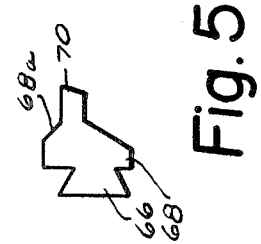

PIPE AND ROD CUT-OFF TOOL

This invention relates to pipe or rod cutters and more particularly to one which has frame carrying rollers that may be engaged with a pipe or rod and the frame rotated around the pipe or rod or the pipe or rod rotated relative to the frame, and separate means for advancing a cutoff tool into the periphery of the pipe or rod to cut the same. Hereinafter it will be referred to, in the interest of brevity, as a pipe cutter.

Cutoff tools or pipe cutters usually include a frame with a pair of rollers for engaging one side of the pipe and one or more cutter wheels for cutting into the other side. As the frame is rotated around the pipe and the rollers and cutter wheel tightened into engagement therewith the cutter wheel penetrates the pipe and eventually severs it. One of the problems in such devices resides in the fact that the use of a cutter wheel causes some displacement of the metal adjacent the cut, both inside and outside of the pipe, requiring a subsequent reaming operation to remove the material displaced on the inside and a chamfering operation to remove the material on the outside. Another problem resides in the difficulty of cutting the pipe off squarely, particularly when there are surface irregularities or the pipe is slightly bent.

The present invention is particularly useful as a cutoff tool in conjunction with motor driven pipe machines of the character shown in U.S. PAT. No. 3,095,772, of July 2, 1963. The cited patent is directed to a pipe cutting tool using the conventional cutter blade. Although the present tool is particularly useful in conjunction with such a machine it will be apparent that it can, with slight modification, be used as a hand operated tool. Although cutting tools using a blade or bit-type cutter have been proposed, they were usually impractical for hand use because of their extreme weight. They were also expensive to manufacture. Cutoff tools that used blade or bit-type cutters were also inconvenient to operate because the control screws were not conveniently located. They were also very bulky and took up a considerable amount of room on a machine which required the machine to be made larger since such machine normally carries a number of tools for threading, reaming and cutting off, increased the weight and reduced the portability. In addition, the pipe frequently had to be inserted into the tool from the end, making is necessary to stop the machine and disengage the pipe from the chuck.

The present invention includes a tool which is very compact and of light weight. It is easy to operate because the control screws are all conveniently available to the operator. When used on a power machine the operator does not have to reach across the machine to make any of the adjustments. Normally when used with a machine of the type described in the cited patent, the pipe is rotated by a motor driven chuck, and the various operations on the pipe are performed by devices that are supported on a carriage that is in turn supported on ways extending parallel to the pipe. The various tools, such as the threading die head and the cutoff tool, may be swung into and out of position for performing the desired operation without stopping the machine or at least disengaging the pipe from the chuck. Because of its manner of support the cutting tool can "follow" irregularities of the pipe, such as slight bends, and still efficiently perform the cutting operation. The actual cutting bit also has longer life than a cutting wheel and can be sharpened when it becomes dull.

Still other advantages of the invention and the invention itself will become more apparent from the following description of an embodiment thereof which is illustrated by the accompanying drawings and forms a part of this specification.

In the drawings:

FIG. 2 is an end view of the cutter carriage with all associated parts removed;

FIG. 3 is a side view of a cutter bit holding slide removed from the carriage;

FIG. 4 is a top plan view of the cutter bit holder of FIG. 3; and

FIG. 5 is a plan view of a cutter bit.

Figure 1:
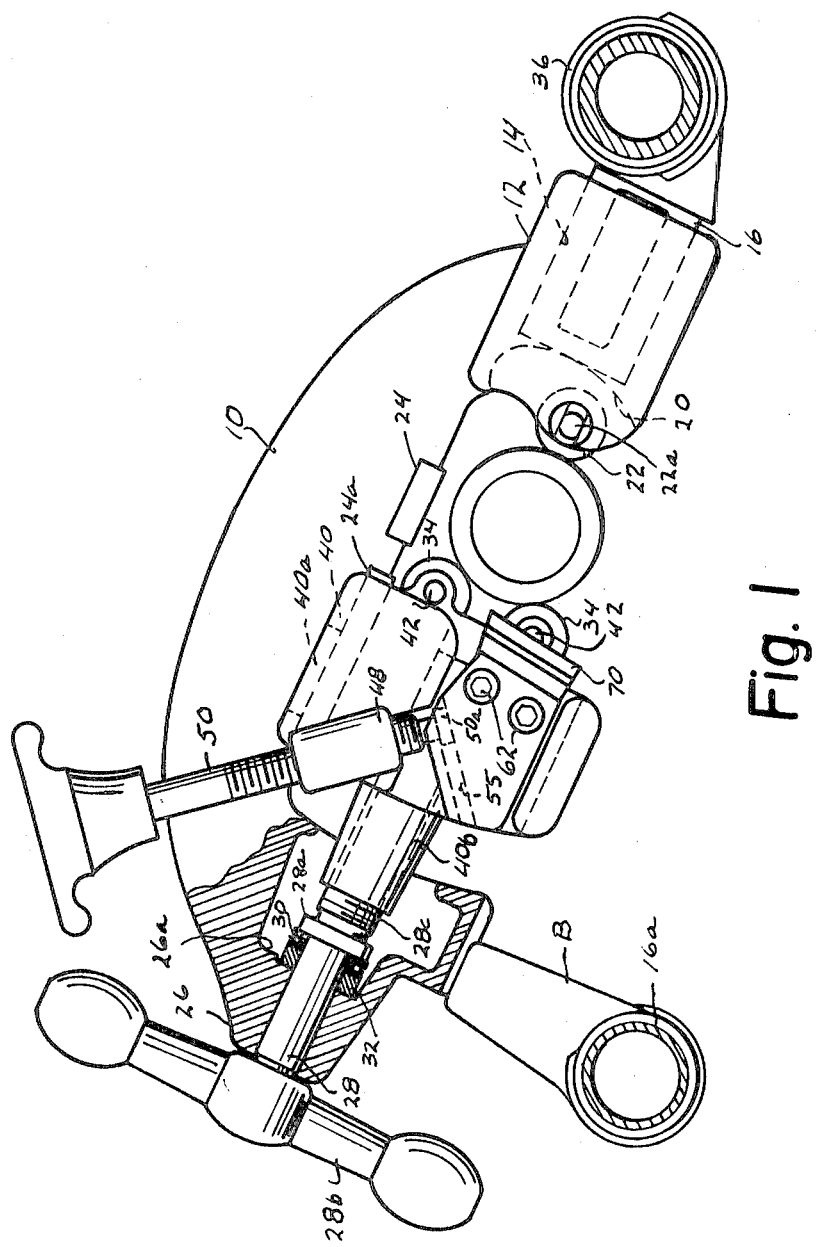
FIG. 1 is a side elevational view of the cutter with certain parts broken away and shown in section.

Although the invention will be described as being used for cutting pipe, it will be apparent that it can be used to cut rods and also used to make grooves or similar shapes in the periphery of a pipe for use with certain types of couplings.

The cutter includes a frame 10 of generally C-shape having an enlarged end part 12 formed with a slideway or socket 14 of rectangular cross section for the reception of a projection 16 carried by a bracket sleeve 36 that is normally mounted on a carriage that is in turn mounted on a pair of ways of pipe machine such as shown in said patent and to which reference may be had for further details.

Inwardly of the slideway 14 a pocket 20 is provided which houses a first pipe engaging roller 22 mounted on a pin 22a bridging the walls of the pocket. Extending along the inner boundary of the frame, and on opposite sides, are laterally extending ways 24–24a on which a backup roller and cutter carriage, later described, is reciprocably supported. The end of the frame 10 remote from and opposite to the end that supports the roller 22 is provided with a boss 26 in which the shank 28 of a carriage moving screw is rotatably disposed. The screw is formed with a collar 28a, and a thrust bearing assembly, which includes a needle bearing 30 and a spacer 32 disposed around the shaft between the collar 28a and the inner wall of a pocket 26a formed in the boss 26. An operating handle 28b is pinned to the shaft 28 on its outer end. The inner portion of the shaft is threaded at 28c for engagement with an internally threaded boss on the carriage for advancing and retracting the same.

The backup rollers and cutter mounting carriage, which is reciprocable on the ways 24–24a by the screw 28, carries a pair of backup rolls 34 which are so disposed as to be equally spaced on each side of a centerline extending through the axis of the screw 28 and the axis of the roller 22. Thus when the carriage is advanced toward the roller 22, the device is held in predetermined centered relation to a diametrical centerline of the pipe coinciding with the centerline first described regardless of the size of the pipe, within the capacity of the tool. The carriage also carries a tool holder slide (which in turn carries a tool bit) that is movable longitudinally on the carriage by independent screw means to advance the tool bit into the pipe.

As can best be seen from FIG. 2, the carriage includes an upper portion formed with pairs of oppositely disposed arms 40 which are broached to provide a T-slot formation for engagement with the ways 24–24a on the frame 10. The gaps 40a in the arms 40 and the ways 24 are for assembly purposes as is well known.

Midway between the top and bottom of the carriage is a rearwardly extending internally threaded boss 40b into which the threaded part 28c of the screw 28 is threaded. When the screw is rotated the carriage is moved bodily on the ways 24–24a. The forward edges of the carriage are provided with pairs of bored bosses 40c and 40d which receive pins 42 on which the backup rolls 34 are mounted. The position of these rolls relative to the axis of the screw 28 has been described. One side of the carriage, to the left side as viewed in FIG. 2 and the near side as viewed in FIG. 1, is formed to provide upper and lower ways 44–46 which extend parallel to the axis of the screw 28 and are arranged to receive the tool holder slide. The upper side of the carriage is formed with an angularly disposed threaded boss 48, for the tool holder slide adjusting screw 50, the axis of which is at and angle of substantially 50° to the axis of the screw 28.

The tool holder slide, FIG. 3, comprises a substantially pentagon-shaped body having upper and lower parallel longitudinally extending portions providing rails 52–54 on one side thereof for sliding engagement in the ways 44–46. One side of the body, extending from the top rail and slanting downwardly and rearwardly to slightly past the midsection is broached to provide a T-slot or way 55 for the reception of the headed end 50a of the screw 50. The forward edge of the body inclines slightly forward in an upward direction and is formed to provide an internal dovetail seat 56 extending longitudinally of that side. The body is slotted at 58 between the seat and a bore 60 to provide flexibility for one side of the body forming the slot, whereby a cutter bit may be clamped in the seat by a pair of Allen head screws 62.

The tool bit includes an elongated external dove-tailed tongue 66 of the same cross-sectional shape and length as the seat 56, extending from a base 68. The outer edge is formed to provide a cutting blade 70, the upper edge having a rearward rake of approximately 15°. The outer edge of the blade is ground to provide a slight angle of the face. The one forward edge of the base is formed to provide a cutting surface 68a of approximately 45° which, as will later appear, can be used to chamfer the edge of the pipe.

In the operation of the device, it will be assumed that it is used in conjunction with the pipe threading machine of the patent noted, wherein the base 12 is supported on the stem 16 of the bracket that is mounted on the machine carriage. The pipe is being rotated by a power driven chuck, the cutter is swung down with the rollers 22–34 on opposite sides of the pipe. At this time the feed screw end of the cutter frame rests on the bracket B carried by the front of the carriage. As shown in said patent, the supports 16–16a and B are on a carriage which can be moved on the ways 18 to enable the cutter to be easily lined up with the place on the pipe where it is to be cut.

As previously stated, the device could be used as a hand held cutter by inserting a suitable handle, not shown, in the boss 12 and locking it in place.

The carriage feed screw is now rotated to move the carriage with its rollers 34 toward the roller 22. This will cause the socket part 12 to move on the projection 16, enabling the rollers 34 to engage with one side of the pipe and the roller 22 with the other side. Previously the tool holder slide has been retracted by the screw 50 so that the cutter bit does not contact the pipe prematurely. With the rollers in engagement with the periphery of the pipe, and the pipe being rotated, the entire frame may now "follow" the movement of the pipe should it be slightly bent.

Next, the cutter bit is advanced into cutting engagement with the pipe. The cutter slide feed screw is rotated clockwise and the pressure of the end 50a against the bottom wall of the T-slot 55 provides camming action therewith to cause the tool holder slide with its bit to move toward the pipe. The bit is so positioned that the forward upper cutting face 70 is at the diametrical centerline of the pipe.

Continued rotation of the cutter slide feed screw causes the bit to remove material from the pipe as a shaving until the pipe is completely severed. If desired, the bit can be moved in until the surface 68a engages the remaining end of the pipe being rotated to chamfer the edge. After severing, the carriage is backed off by the feed screw 28 to disengage the rollers from the pipe and the entire tool may now be swung upward out of the way.

It will be noted that the open frame enables the tool to be used in conjunction with a pipe machine where the tool may be swung out of the way and does not interfere with the use of the threading dies, and enables it to be quickly swung down into cutting position at the time a cut is to be made. The rollers provide a relatively large bearing engagement with the pipe and do not score the pipe.

Of particular interest is the fact that the feed screws are protected against damage, particularly the screw 28. These screws are also conveniently placed in proximity to each other but still independent of each other, where they may be operated from the front of the machine and the mechanic does not have to reach across the machine to make any adjustments. The cutoff-type tool bit may be replaced by a grooving tool when it is desired to form a groove near the end of the pipe or a tapering tool if the end of the pipe is to be tapered.

I claim:

1. A cutting tool for cutting cylindrical objects comprising an open C-shaped frame formed with ways and arranged to be placed in surrounding relation to an object to be cut, an object engaging means at one end thereof, a carriage reciprocably mounted on said ways and means connected between the frame and the carriage for reciprocating the carriage on the ways, second object engaging means carried by the carriage and in conjunction with said first object engaging means connecting the frame to the object and positioning the frame in predetermined relation thereto, a cutting tool slide reciprocably mounted on the carriage and screw means connected between the carriage and the slide to move the slide on the carriage and a cutting tool carried by the slide for cutting engagement with the object, said cutting tool slide being formed with a surface slanting at an angle to the ways of the carriage and said screw means being disposed with its axis normal to said surface.

2. A device as described in claim 1 wherein handle means is provided for controlling the carriage reciprocating and slide screw means, disposed closely adjacent to each other.

3. A device as described in claim 1 wherein said screw means and said tool slide are interlocked with each other.

4. A device as described in claim 3 wherein said interlocking means comprises a T-slot substantially coextensive with said slanting surface, and said screw means has a head disposed in said slot.